US012743591B2

(12) United States Patent
Berry, III et al.

(10) Patent No.: US 12,743,591 B2
(45) Date of Patent: Sep. 22, 2026

(54) SYSTEMS AND METHODS FOR PRINTING LOTTERY TICKETS CONTAINING 'SMART' QR CODES

(71) Applicant: DataSurge, LLC, West Chester, OH (US)

(72) Inventors: Lincoln Berry, III, Miamisburg, OH (US); Andrew Jacob Neff, Miamisburg, OH (US)

(73) Assignee: DataSurge, LLC, West Chester, OH (US)

( * ) Notice: Subject to any disclaimer, the term of this patent is extended or adjusted under 35 U.S.C. 154(b) by 0 days.

(21) Appl. No.: 19/648,164

(22) Filed: Apr. 15, 2026

(65) Prior Publication Data

US 2026/0252827 A1 Aug. 27, 2026

Related U.S. Application Data

(63) Continuation of application No. 19/369,944, filed on Oct. 27, 2025.

(60) Provisional application No. 63/761,343, filed on Feb. 21, 2025.

(51) Int. Cl.
*G06K 1/12* (2006.01)

(52) U.S. Cl.
CPC .................................. *G06K 1/121* (2013.01)

(58) Field of Classification Search
CPC ..................................................... G06K 1/121
USPC ........................................................ 235/494
See application file for complete search history.

(56) References Cited

U.S. PATENT DOCUMENTS

2013/0112744 A1 5/2013 Landers
2013/0179156 A1 7/2013 Fried et al.
2013/0219479 A1 8/2013 DeSoto et al.
2014/0080564 A1 3/2014 Acres et al.
(Continued)

FOREIGN PATENT DOCUMENTS

KR 100989103 B1 10/2010
KR 101238900 B1 3/2013
(Continued)

OTHER PUBLICATIONS

International Search Report and Written Opinion dated Mar. 3, 2026, pertaining to Int'l Patent Application No. PCT/US2025/052618, 16 pgs.

*Primary Examiner* — Daniel A Hess
(74) *Attorney, Agent, or Firm* — Dinsmore & Shohl LLP

(57) ABSTRACT

A system for printing uniquely identifiable quick response (QR) code-containing physical mediums and assigning feedback instructions for the same may comprise a printer and an apparatus comprising a processing system configured to cause the apparatus to execute computer-executable instructions stored in one or more memories, comprising: generating a plurality of unique QR codes each comprising non-unique information and unique information comprising unique identification data (UID), assigning each of the plurality of unique QR codes to a respective simulated ticket of a plurality of simulated tickets, assigning print information to each of the plurality of simulated tickets, generating a simulated ticket layout for the plurality of simulated tickets, assigning one or more ticket control numbers to each of the plurality of unique QR codes and one or more feedback instructions to each of the ticket control numbers, and printing a plurality of tickets via the printer.

20 Claims, 6 Drawing Sheets

(56) References Cited

U.S. PATENT DOCUMENTS

2014/0148235 A1 5/2014 Luciano, Jr. et al.
2016/0354684 A1 12/2016 Murray
2017/0228965 A1 8/2017 Irwin, Jr. et al.
2018/0012453 A1 1/2018 Anderson
2021/0110654 A1 4/2021 Lindelsee et al.
2024/0181336 A1* 6/2024 Guziel .................. A63F 3/0421
2024/0321036 A1 9/2024 Weaver et al.
2025/0117768 A1* 4/2025 Boroosan ............. G06Q 20/322

FOREIGN PATENT DOCUMENTS

KR 20220011314 A 1/2022
WO 2012100353 A1 8/2012
WO 2013190351 A1 12/2013

* cited by examiner

FIG. 4A
Activated Boxes
9
Total activated ticket boxes
Tickets Claimed
322
Total tickets claimed
Total Paid To-Date
$22,795.00
Total amount paid out
Outstanding
$5,294.00
92 winning tickets
3200
2400
1600
800
0
0013378
0013335
0013307
0013392
0013380
0013423
Paid Out ($)
Outstanding ($)

SYSTEMS AND METHODS FOR PRINTING LOTTERY TICKETS CONTAINING 'SMART' QR CODES

CROSS REFERENCE TO RELATED APPLICATIONS

This application is a continuation of the U.S. patent application Ser. No. 19/369,944 filed Oct. 27, 2025, which claims the benefit of U.S. Provisional Application Ser. No. 63/761,343, filed Feb. 21, 2025, which is hereby incorporated by reference.

FIELD

The present disclosure relates to systems and methods utilizing physical mediums containing QR codes. Particularly, the present disclosure relates to systems and methods for printing uniquely identifiable QR-code containing physical mediums, as well as feedback instructions, which may also be unique, assigned to each such QR code owing to the QR codes being uniquely identifiable.

BACKGROUND

Gambling and lottery-based systems may take a variety of forms, some of the most recognized of which are the individualized lottery mediums of scratch-off and pull-tab tickets. In general, scratch-off and pull-tab tickets include printed information on a variable medium with both hidden and un-hidden information, the revealing of the hidden information of which determines whether the ticket is eligible for a specified prize (wins) or does not (loses).

As previously mentioned, the tickets may be winning or losing tickets, the winning tickets of which may range in the amount won. These various win and loss outcomes may be specified ahead of time, leading to a plurality of tickets commonly referred to as a 'deck'.

However, in the production of the decks, sheets, and individual tickets, a common problem occurs in how to best distribute the winning and losing tickets. Procedures to address this problem vary based on the manufacturer. For example, some manufacturers print all the winning entries on a single sheet, with the remaining sheets and plurality of sheets all being predetermined losers.

Accordingly, each of the losing tickets do not require any unique identifying information. Other methods involve distributing the winning tickets in a predetermined locations on a grid, with the remaining entries again being predetermined losers not requiring any unique information. In both of these methods, the individual tickets may then be cut out and shuffled to evenly distribute the winners and losers.

However, as consumers of the ticket only redeem the winning tickets, the losing tickets are thereby worthless to the consumer once an outcome is determined. This may be harmful to advertising as a secondary source of revenue to the ticket manufacturer and/or distributors of the tickets and decks. Particularly, third parties may desire to provide advertising to a user/consumer both at the initial time of purchase and at the time of redemption.

One potential avenue for engagement of both winning and losing tickets is to require the consumer to redeem the ticket to determine if the ticket is a winner or loser, thereby hiding the results. However, consumer preference indicates that this is not preferred as it removes the immediate visual feedback and may lead to a feeling of unfairness in an impulse and repeater buyer market with varied options available.

SUMMARY

Another potential avenue for increased consumer engagement are sweepstakes. In sweepstakes, a user may redeem an otherwise worthless losing ticket for an opportunity to play a second game that has a lower chance or amount of reward. Similarly, other options could be provided to a user to encourage redemption of losing tickets, such as loyalty programs which offer discounts or free items at the associated distributor in exchange for repeated purchases or initial purchases over a certain volume. However, these options require a way of uniquely identifying each ticket to prevent multiple instances of redemption or fraud (as otherwise a user could repeatedly scan a losing ticket amass sweepstakes entries and/or loyalty rewards), such that these options may be incompatible with previous methods of printing and redemption of predetermined sheets of winners and losers.

Accordingly, systems and methods are desired by which tickets may be generated in a manner in which each such ticket may be quickly and uniquely identifiable at the time of printing and redemption. Consequently, embodiments herein fulfill the aforementioned need by providing methods for printing and redeeming QR codes on a plurality of tickets on a physical medium, in which each ticket may be uniquely identifiable by the QR code on the ticket, the QR code of which may also be utilized as the method of quickly and easily redeeming the ticket.

Accordingly, as explained in more detail herein, the generation of the unique QR codes may provide an unexpected benefit in that the ability to uniquely identify each ticket may also enable the redemption feedback associated with each ticket to be uniquely controlled. For example, being able to uniquely identify each ticket at the time of scanning the QR code may allow the QR database to attribute one or more feedback instructions to each QR code that is subsequently returned to the source of the URL access command, the feedback instructions of which may be wholly unique to each individual ticket or shared between different categories of tickets (all winning tickets, all losing tickets, all same winning amounts, all tickets distributed to a specific distributor, all tickets distributed to a specific location, etc.). In other words, the feedback instructions may determine the information (advertising, payment authorization, sweepstakes entry, etc.) sent back to the origin of the URL access command.

Further, the ability to uniquely identify each ticket, optionally in conjunction with the ticket information and print information on the ticket itself may allow easier tallying of redeemed tickets in the deck and analytics surrounding the same, such as which tickets have been redeemed, which tickets and/or winnings are still outstanding, which locations are attributable for a majority of the ticket sales, which categories of decks (and associated art) are selling the most, which locations need new sets of decks provided, etc. This may be especially useful when the tickets of the same deck are split into multiple locations and/or the number of individual tickets may amount in the thousands, frustrating the ability to generate by-hand or mental tallying and analytics. This may provide a variety of benefits to computer processing on top of business motivations, such as, but not limited to, lowering the amount of data transmission, computer storage requirements, etc.

Other aspects herein provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

In one embodiment according to the present disclosure, a system for printing uniquely identifiable quick response (QR) code-containing physical mediums and assigning feedback instructions for the same comprises a printer and an apparatus comprising a processing system configured to cause the apparatus to execute computer-executable instructions stored in one or more memories, comprising: generating a plurality of unique QR codes each comprising non-unique information and unique information comprising unique identification data (UID), assigning each of the plurality of unique QR codes to a respective simulated ticket of a plurality of simulated tickets, assigning print information to each of the plurality of simulated tickets, generating a simulated ticket layout for the plurality of simulated tickets, assigning one or more ticket control numbers to each of the plurality of unique QR codes and one or more feedback instructions to each of the ticket control numbers, and printing a plurality of tickets via the printer.

In another embodiment according to the present disclosure, a system for printing uniquely identifiable quick response (QR) code-containing physical mediums and assigning feedback instructions for the same comprises a printer configured to print tickets on one or more physical mediums; and an apparatus comprising a processing system comprising one or more memories and one or more processors, the processing system configured to cause the apparatus to execute computer-executable instructions stored in the one or more memories, comprising: generating a plurality of unique QR codes, the plurality of unique QR codes each comprising unique information and non-unique information, wherein the unique information comprises unique identification data (UID), and wherein the non-unique information comprises a website uniform resource locator (URL) destination, a win or loss designation, and a win amount designation, assigning each of the plurality of unique QR codes to a respective simulated ticket of a plurality of simulated tickets, assigning print information to each of the plurality of simulated tickets based on the win or loss designation and the win amount designation, generating a simulated ticket layout for the plurality of simulated tickets on the one or more physical mediums, assigning one or more ticket control numbers to each of the plurality of unique QR codes, assigning one or more feedback instructions to each of the ticket control numbers, storing the plurality of unique QR codes in a QR database hosted on the one or more memories, and printing a plurality of tickets on the one or more physical mediums via the printer based on the simulated ticket layout.

In yet another embodiment according to the present disclosure, a method for printing uniquely identifiable quick response (QR) code-containing physical mediums and assigning feedback instructions for the same comprises generating a plurality of unique QR codes via a processing system comprising one or more processors and one or more memories, the plurality of unique QR codes each comprising unique information and non-unique information, wherein the unique information comprises unique identification data (UID), and wherein the non-unique information comprises a website uniform resource locator (URL) destination, a win or loss designation, and a win amount designation; assigning each of the plurality of unique QR codes to a respective simulated ticket of a plurality of simulated tickets; assigning print information to each of the plurality of simulated tickets based on the win or loss designation and the win amount designation; generating a simulated ticket layout for the plurality of simulated tickets on the one or more physical mediums; assigning one or more ticket control numbers to each of the plurality of unique QR codes; assigning one or more feedback instructions to each of the ticket control numbers; storing the plurality of unique QR codes in a QR database hosted on the one or more memories; and printing a plurality of tickets on one or more physical mediums via a printer communicatively coupled to the processing system based on the simulated ticket layout.

In yet another embodiment according to the present disclosure, a system for printing uniquely identifiable quick response (QR) code-containing physical mediums and assigning feedback instructions for the same, the system comprising: a printer configured to print lottery tickets on one or more physical mediums; and an apparatus comprising a processing system comprising one or more memories and one or more processors, the processing system configured to cause the apparatus to execute computer-executable instructions stored in the one or more memories, comprising: generating a plurality of unique QR codes, the plurality of unique QR codes each comprising unique information and non-unique information, wherein the unique information comprises unique identification data (UID) comprising a multicharacter code, wherein the non-unique information comprises a website uniform resource locator (URL) destination, a win or loss designation, and a win amount designation, and wherein the UID is encoded in the website URL destination, assigning each of the plurality of unique QR codes to a respective simulated ticket of a plurality of simulated tickets, assigning print information to each of the plurality of simulated tickets based on the win or loss designation and the win amount designation, generating a simulated ticket layout for the plurality of simulated tickets on the one or more physical mediums, assigning one or more ticket control numbers to each of the plurality of unique QR codes, assigning one or more feedback instructions to each of the ticket control numbers, storing the plurality of unique QR codes in a QR database hosted on the one or more memories, the one or more memories also hosting a QR code data proxy and one or more servers, printing a plurality of tickets on the one or more physical mediums via the printer based on the simulated ticket layout, receiving a URL access command associated with one of the unique QR codes of one of the plurality of tickets, the URL access command comprising the website URL destination and the UID, redirecting the URL access command via the QR code proxy to the one or more servers communicatively coupled to the QR code proxy, filtering the UID from the URL access command via a web application service of the one or more servers, associating the UID of the URL access command with the corresponding UID of the one of the plurality of unique QR codes in the QR database via the web application service, and transmitting the one or more feedback instructions associated with the one of the plurality of unique QR codes in the QR database to an origin of the URL access command.

Additional features and advantages of the described embodiments will be set forth in the detailed description which follows, and in part will be readily apparent to those skilled in the art from that description or recognized by practicing the described embodiments, including the detailed description which follows as well as the claims.

BRIEF DESCRIPTION OF THE DRAWINGS

The following detailed description of specific embodiments of the present disclosure can be best understood when read in conjunction with the following drawings, where like structure is indicated with like reference numerals and in which.

Reference will now be made in greater detail to various embodiments, some embodiments of which are illustrated in the accompanying drawings. Whenever possible, the same reference numerals will be used throughout the drawings to refer to the same or similar parts.

DETAILED DESCRIPTION

Figure 1:
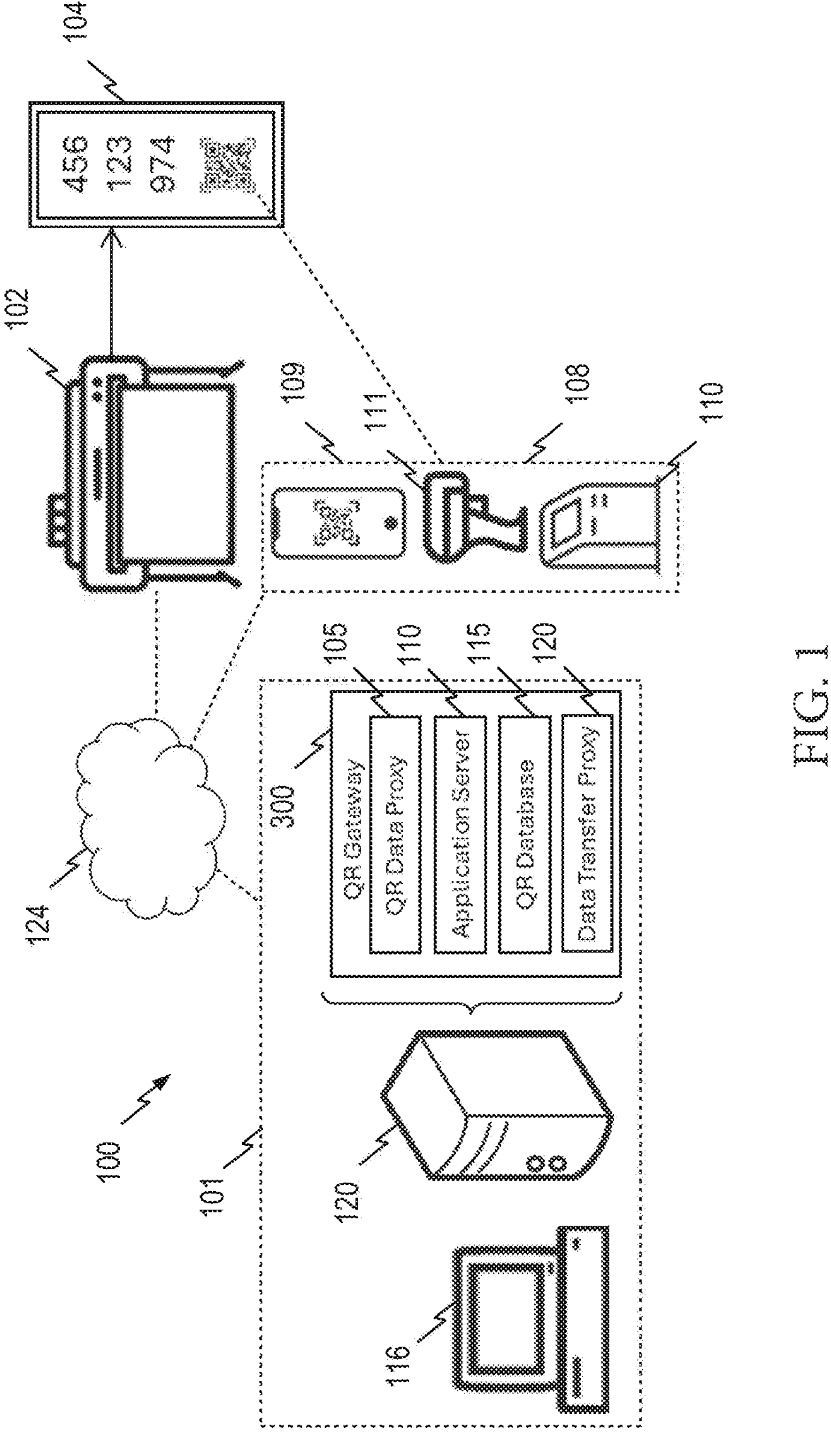
FIG. 1 illustrates a system for printing and utilizing QR codes, according to embodiments herein.

As previously stated, embodiments herein relate to systems and methods utilizing physical mediums containing QR codes. Particularly, embodiments herein relate to systems and methods for printing uniquely identifiable QR-code containing physical mediums, such as lottery tickets, as well as feedback instructions, which may also be unique, assigned to each such QR code owing to the QR codes being uniquely identifiable.

For example, provided herein are systems and methods in which each ticket may be uniquely identifiable by Unique Identification Data (UID) on each of the one or more QR codes of each ticket. The nature of the QR codes may also enable unique processes to be assigned via ticket control numbers to each of the plurality of QR codes and tickets in a QR database from which the URL access command is eventually received.

The QR code may be scannable on a distributor-side scanner, a kiosk, or by a consumer smartphone or similar device each having QR code scan capabilities, and accordingly, the scanning means is not particularly limited.

Accordingly, as explained in more detail herein, the generation of the unique QR codes may provide an unexpected benefit in that the ability to uniquely identify each ticket may also enable the redemption feedback associated with each ticket to be uniquely controlled. For example, being able to uniquely identify each ticket at the time of scanning the QR code may allow the QR database to attribute one or more feedback instructions to each QR code that is subsequently returned to the source of the URL access command, the feedback instructions of which may be wholly unique to each individual ticket or shared between different categories of tickets (all winning tickets, all losing tickets, all same winning amounts, all tickets distributed to a specific distributor, all tickets distributed to a specific location, etc.). In other words, the feedback instructions may determine the information (advertising, payment authorization, sweepstakes entry, etc.) sent back to the origin of the URL access command to be displayed at the kiosk, consumer smart phone, or similar.

Further yet, as explained in more detail herein, the generation of the unique QR code tickets may provide an additional unexpected benefit in that the ability to uniquely identify each ticket may also enable the redemption feedback to be modified after circulating the tickets and/or after one or more tickets have been redeemed. In other words, the redemption feedback of each of the tickets may not be static after circulation, and may be modified on the back-end through the one or more ticket control numbers, such as to account for time-sensitive deals by a distributor.

In other example, and in embodiments, the QR database may link ticket information (an internet protocol (IP) address that may be associated with a location or a time of purchase) provided at a time of scanning a QR code on the ticket to the URL access command. The QR database may then modify what is to be displayed to the consumer at the time of redemption of the unique individual ticket (and thereby act to control the ticket's redemption feedback) based on the ticket information, such as the location of purchase (offering local promotions) or time of redemption (offering discounts on products predicted to be purchased at a particular time of the day).

Finally, the ability to uniquely identify each ticket, optionally in conjunction with the ticket information and print information on the ticket itself, allows easy tallying of redeemed tickets in the deck and analytics surrounding the same, such as which tickets have been redeemed, which tickets and/or winnings are still outstanding, which locations are attributable for a majority of the ticket sales, which categories of decks (and associated art) are selling the most, which locations need new sets of decks provided, etc. This may be especially useful when the tickets of the same deck are split into multiple locations and/or the number of individual tickets may amount in the thousands, frustrating the ability to generate by-hand or mental tallying and analytics. This may provide a variety of benefits to computer processing on top of business motivations, such as, but not limited to, lowering the amount of data transmission, computer storage requirements, etc.

Further yet, in another example, consumers may create a user account associated with the distributor for the tickets, log-in to which may be presented at the time of redeeming the ticket. The user account may contain basic identifying information for the consumer such as that contained in a driver's license or state/federal ID. The URL access command may then be linked with the user account to provide entries for the user into sweepstakes or loyalty rewards programs that may have associated rewards.

In so doing, consumers may have motivation to collect and redeem losing tickets, increasing engagement for the user. Further yet, the additional information provided by the user in the user account may be utilized, optionally in conjunction with the ticket information, to generate a personalized advertising and/or offer package from the limited information available, again limiting the amount of data transmission across the system and improving computer processing. The system may then provide the personalized advertising package to the consumer at the time of redemption as a sub-algorithm to the feedback instructions. This may tailor to a consumer's predicted interests, which may based on, for example, the customer's past purchasing preferences associated with the distributor, the category of purchases made in a particular geographical area, the category of purchases ordinarily made at a certain time in the day (such as but not limited to caffeinated drinks or food associated with a particular time of day meal).

Now referring to FIG. 1, illustrated is a system 100 for printing tickets 104 each containing one or more QR codes, as well as for redemption of the same upon the receipt of a URL access command from a QR-equipped device 108 ((such as a user electronic device 109, a kiosk 110, or a QR-code scanner 111). As shown, the system may comprise one or more printers 102 and an apparatus comprising a processing system 101 comprising one or more memories 120 and one or more processors 116. In embodiments, the one or more processers may comprise a computing device. The one or more memories may comprise a QR database. In embodiments, the processing system, through the one or more processors (also commonly referred to as a controller) may be programmed to execute computer-executable instructions stored in the one or more memories with the one or more printers and the non-transient computer readable media, as explained in further detail herein.

In embodiments, the one or more printers may be communicatively coupled to the processing system such as through a network 124. Similarly, the one or more components of the processing system may similarly be connected over the network 124. The network 124 may be, for example, a direct link, a local area network (LAN), a wide area network (WAN), such as the Internet, another type of network, or a combination of one or more of these networks.

The memory 120 may be geographically co-located servers on the same rack or on different racks in any arbitrary location in a data center. The memory 120 may be constructed on a server grade hardware platform and include components of a computing device such as, one or more processors (e.g., central processing units (CPUs)), one or more memories (e.g., random access memory (RAM)), one or more network interfaces (e.g., physical network interfaces (PNICs)), storage, and other components.

The one or more printers 102 may be configured to print information on one or more physical mediums. In embodiments, the one or more printers 102 may be any one of a number of digital printers known to one of ordinary skill in the art and/or used to print lottery tickets, such as a variable data printing press or equivalents thereof, including but not limited to an AccurioJet® KM-1 printing press. However, the ink deposition means for the digital printer is not particularly limited, and may include, but may not be limited to, an ink printer, a thermal printer, or a laser printer.

In any case, the one or more printers 102 may similarly comprise a processing system, which may be the aforementioned processing system 101 (such as in the case of a printer and a raster imaging processor (RIP)), which may contain software or firmware to manage the mechanisms of the one or more printers in response to printing instructions provided from the computing device. For example, and in embodiments wherein the one or more printers are variable data printing presses, the printing process may be data-driven and data-dependent in response to the printing instructions provided from the processing system (such as via the computer executable-instructions), as opposed to being fixed as in Offset or Die-Cut printing.

As previously stated, the system may comprise one or more printers. The one or more printers may be configured to print tickets on one or more physical mediums making up a deck comprising a plurality of tickets, as explained in further detail herein. Particularly, the one or more printers may be configured to print tickets based on instructions received from the computing device comprising a simulated ticket layout on the one or more physical mediums.

The one or more physical mediums may comprise one of a number of solid materials or combinations thereof, and so is not particularly limited. For example, the physical medium may comprise engineered wood products (paper, cardboard, fiberboard, etc.) with one or more of a number of additives to provide various resistances to the ticket, such as but not limited to water, oils, flame, shearing, puncturing, etc.

As previously stated, a plurality of tickets may be printed on the one or more physical mediums. Each of the plurality of tickets may comprise print information and one or more of QR codes. The print information may include, but may not be limited to, dimensions of each of the plurality of tickets, ornamental art (graphics, symbols, logos, letters, numbers) for each of the plurality of tickets, art combinations for winning tickets, art combinations for losing tickets, art combinations for winning ticket amounts, text per manufacturer specification, or combinations thereof.

The print information may also be separated into hidden and non-hidden portion categories. For example, print information, such as at least some of the art (as well as the QR code(s)), may be segregated into a category of information for display on the hidden portion of the ticket, i.e. the portion to be obscured by tabs or protective film for identifying a winning or losing ticket, such as the art combinations for winning/losing tickets. The non-hidden portion category of the print information may then be segregated into a category of information for display on the non-hidden portion of the ticket, i.e., the remaining portion of the ticket not obscured by tabs and/or a protective film.

As previously stated, the ticket may comprise non-hidden and hidden portions, the hidden portions of which may be obscured by tab(s) and/or protective film(s). Accordingly, in at least some embodiments, the one or more printers may be configured to affix an overlying medium, such as the tabs and/or the protective films previously mentioned, before or after the printing of the tickets on the physical medium, as one of ordinary skill in the art would understand. Further, this overlying medium may be configured to obscure the unique QR code and at least a portion of the print information of each of the lottery tickets. However, in other embodiments, the one or more printers of the systems herein need not be configured to affix the overlying medium and/or the overlying medium may already be affixed (such as in the case of thermal printing), and so the system is not particularly limited as such.

Still referring to FIG. 1, the QR-equipped devices 108 may also be communicatively coupled to the processing system, such as through the network 124 or another network. For example, the QR-equipped device (such as the user electronic device 109, the kiosk 110, or the QR-code scanner 111) may have a user interface which may be used to scan a QR code of one of the tickets and subsequently communicate with the processing system, such as a web application service hosted on one or more servers of the one or more memories wherein data stored in the QR database is accessible by the processing system, as explained in further detail herein.

Figure 2:
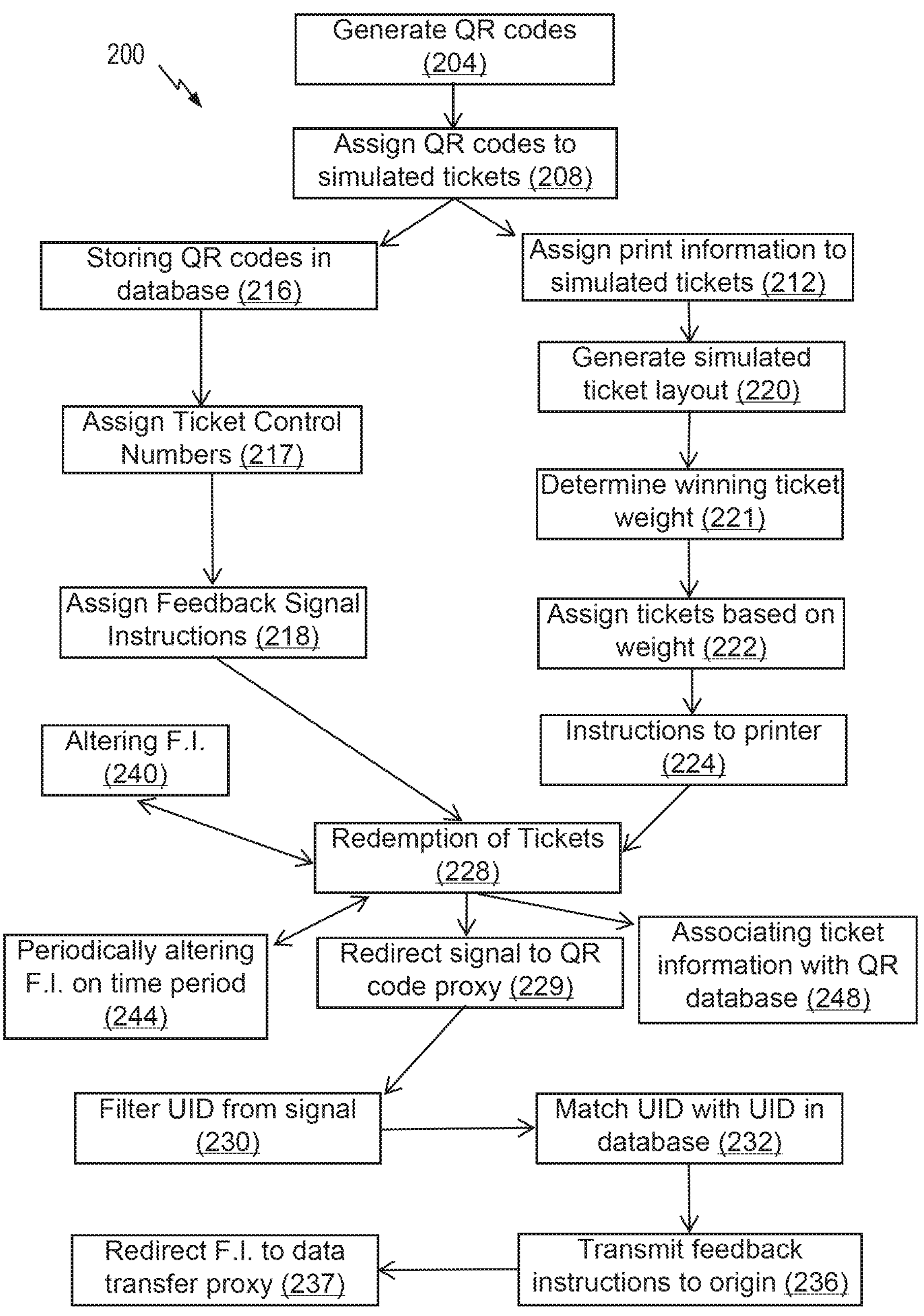
FIG. 2 illustrates an example workflow for a method operable by the system, according to embodiments herein.

Now referring to FIG. 2, illustrated is an example workflow 200, for example, one or more aspects of workflow 200 may be performed using system 100 described in FIG. 1. Specifically, workflow 200 may be used to generate the plurality of QR codes, cause printing of the plurality of tickets, and provide data (eg., ticket control numbers, feedback instructions, etc.) to the QR-equipped device based on scanning of QR codes. Although workflow 200 may be described with reference to printing and control of QR-code having tickets in one deck, in other examples, the workflow 200 may be used for printing and control of multiple different decks.

Initially, at step 204, a plurality of unique QR codes may be generated by the computing device and/or imported into the computing device from an external source. The plurality of unique QR codes each may comprise unique information and non-unique information encoded into the QR code. The non-unique information may comprise encoded data comprising a website URL destination. The non-unique information may also comprise a win or loss (ticket) designation and a (ticket) win amount designation in accordance with the game theme information printed on the hidden portion of the ticket. The unique information may comprise unique identification data (UID). The UID may itself comprise a multi character code (greater than or equal to 5 characters, 10 characters, 15 characters, etc.) which may be generated based on a custom alphabet compatible with URL designations. The UID may be embedded in a short URL following a defined format, such as the website URL destination, and encoded as the QR code.

For example, and in embodiments, a look-up table of the QR codes may be created and populated with a plurality of QR codes each containing a UID, which may subsequently be stored as a QR database. This lookup table can be visualized as raw tabular data, for example, as in an SQL-style database, or even the rows and columns of an ordinary spreadsheet, e.g.; Microsoft Excel®, Google Sheets®, or equivalent.

In step 208, each of the plurality of unique QR codes may be assigned to a respective simulated ticket of a plurality of simulated tickets, the simulated tickets modeling the plurality of tickets to be printed for the deck.

In step 212, print information may be assigned to each of the plurality of simulated tickets based on the win or loss designation and the win amount designation of the corresponding QR code. For example, given a win designation for a simulated ticket, print information comprising ornamental art, art combinations for the winning ticket and/or the winning amount may be assigned to the simulated ticket.

In step 216, the plurality of unique QR codes may be stored in the QR database 301 of FIG. 1. The QR database may be used for QR redemption and feedback part of workflow 200.

In step 217, one or more ticket control numbers may then be assigned to each of the plurality of unique QR codes. For example, and in embodiments, the unique QR codes in the look-up table may be linked with one or more ticket control numbers that may point to one or more QR codes in the lookup table of the QR database, the one or more ticket control numbers stored, interpreted, and modifiable in the QR database.

In other words, a single ticket control number may point to multiple QR codes in the lookup table in the QR database, such as when a global modification command is entered, such as when the deck is deactivated after the promotion is over and/or all tickets are sold. Alternatively or additionally, multiple ticket control numbers may point to a single QR code, such as when multiple redemption sub-feedbacks are desired to be attributed to the ticket.

The one or more ticket control numbers may be provided in the form of, but may not be expressly limited to, a stock keeping unit (SKU) number, a serial number, a batch number, or any arbitrary string of digits, letters, etc., that point, guide, or link to the one or more QR code UIDs in the lookup table in the QR database.

Further, in step 218, one or more feedback instructions may be assigned to each of the ticket control numbers. For example, and in embodiments, a variety of feedback instructions (also referred to as behaviors or redemption feedbacks) may be transmitted to be stored in the QR database. These feedback instructions may then be variously assigned to the appropriate ticket control numbers, such as based on the non-unique information on the QR codes. For example, and as explained in further detail herein, the feedback instructions may comprise a multitude of instructions and display commands for the appropriate situation, including but not limited to displays of specific advertising, displays and authorization for coupons, sweepstakes and loyalty programs displays and entry portals, authorizations for payment dispensation and amount on a winning ticket, etc. The feedback instructions may also be assigned to groups of tickets having similar characteristics, globally, or individually, such that each ticket may have one or more shared behaviors or wholly unique behaviors.

For example, and in embodiments, a win ticket control number may be assigned to all of the QR codes in the QR database comprising a win designation, wherein the feedback instructions associated with the win ticket control number comprise a winning ticket display command. Additionally, a win amount ticket control number may be assigned to all of the QR codes in the QR database comprising a win amount designation, wherein the feedback instructions associated with the win amount ticket control number comprise a winning amount display command. Further yet, a loss ticket control number may be assigned to all of the QR codes in the QR database comprising a loss designation, wherein the feedback instructions associated with the loss ticket control number comprise a losing ticket display command. The losing ticket display command may also be co-exclusive with the winning ticket display command and the winning amount display command, such that the feedback instructions may also have a priority override instruction.

Further yet, the feedback instructions associated with the win ticket control number or the loss ticket control number may further comprise a user login page, a sweepstakes URL display command, a sweepstakes URL destination, or combinations thereof.

Further yet, a global activation ticket control number may be assigned to all of the unique QR codes and the feedback instructions assigned to the global activation ticket control number may be a global modification command comprising either a global activation command or a global deactivation command, the global deactivation code co-exclusive with all other feedback instructions. Accordingly, by modifying the feedback instructions, decks may be rendered operational upon confirmed distribution, minimizing fraudulent redemptions before consumer exposure, or rendered deactivated (generating a 404 error or default landing website to the source of the URL access command) upon determination that all winning tickets have been redeemed and/or that one or more tickets exhibit signs of fraudulent redemption.

Going back to the printing of the plurality of tickets, in step 220, a simulated ticket layout may be generated for the plurality of simulated tickets on the one or more physical mediums. The simulated ticket layout may comprise a location for each of the simulated tickets based on the dimensions of the one or more physical mediums and the dimensions of each of the simulated tickets. For example, the simulated ticket layout may be based how many tickets will fit on each of the one or more physical mediums, and thereby reserve an amount of the one or more physical mediums for distributing the number of tickets.

In at least some embodiments, generating the simulated ticket layout may additionally be executed according to a set of rules to minimize the proximity of winning tickets when a deck size is large to the extent a plurality of the physical mediums is necessary. For example, in step 221, a maximum number of tickets comprising a win designation may be designated per physical medium according to a ticket distribution formula, such as by utilizing the data in the QR database. In step 222, each of the simulated tickets may then be assigned to a location on the plurality of physical mediums such that each physical medium of the plurality of physical mediums does not exceed the maximum of ticket comprising the win designation per physical medium.

In step 224, following the assigning of the simulated ticket layout, instructions may then be generated, based on the simulated ticket layout, and transmitted to the one or more printers (e.g., printer 112 in FIG. 1) for printing the plurality of tickets on the one or more physical mediums via the printer based on the simulated ticket layout. These tickets making up the one or more physical mediums may then be separated and optionally shuffled, making up the deck, which may then be distributed to one or more distributors for sale.

In step 228, following the transmitting of the printing instructions and the printing of the plurality of tickets followed by their subsequent distribution, the QR codes on the plurality of tickets can begin to be redeemed and the plurality of feedback instructions sent in response to a URL access command. For example, and in embodiments, a URL access command of one of the plurality of tickets may be received, the URL access command comprising the website URL destination and the UID.

Figure 3:
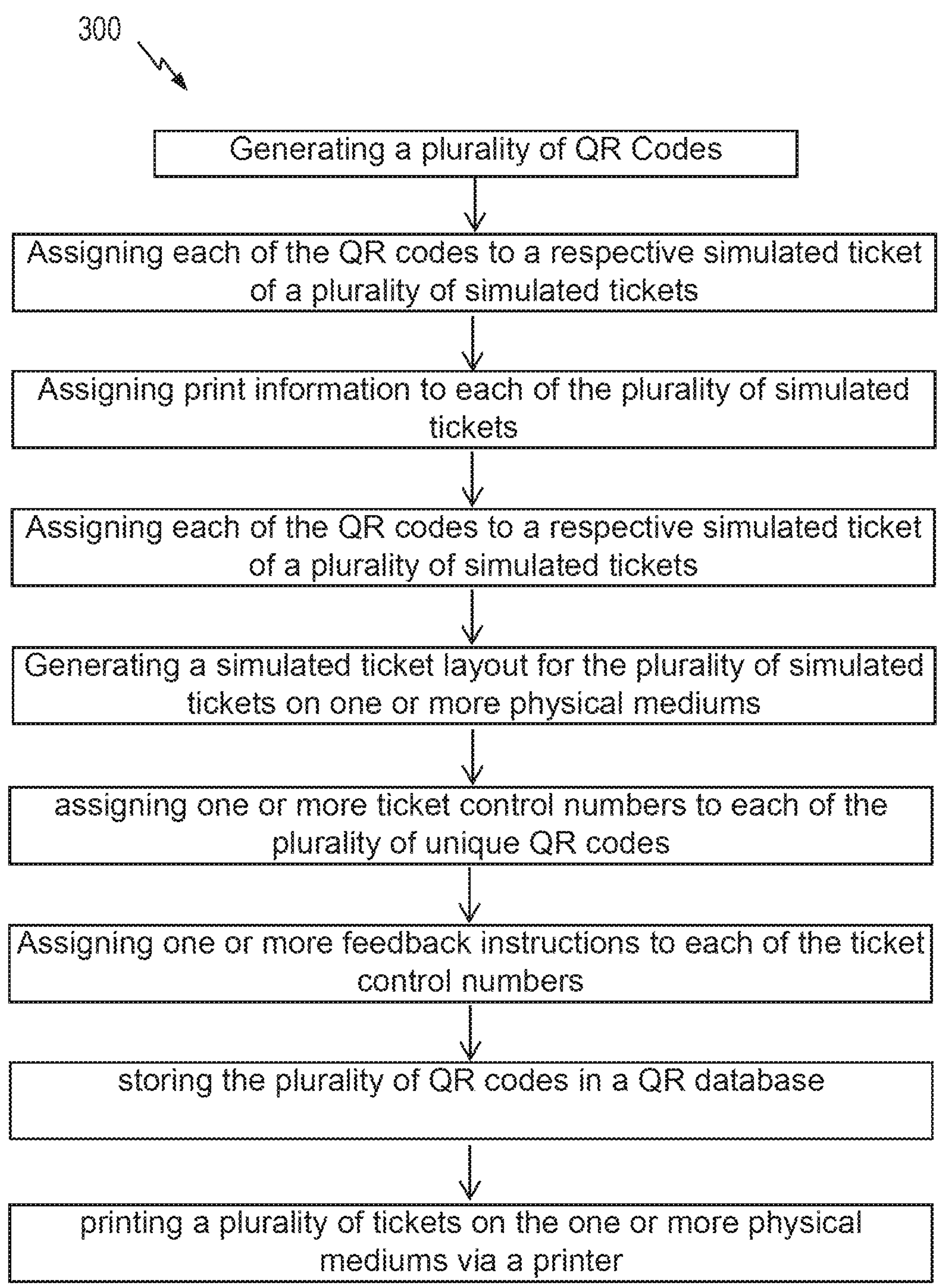
FIG. 3 illustrates a method for printing and utilizing QR codes, according to embodiments herein.

Note that workflow 200 is just one example, and other flows having additional, fewer, alternative, or differently ordered steps may be implemented. For example, and in embodiments, the workflow 200 may be performed as the set of steps 300 provided in FIG. 3.

Referring back to FIG. 1, the system 100 may further comprise a QR gateway 300, which interacts with the QR codes and the QR-equipped devices such as via network 124 and may be hosted on the one or more memories 120 of the processing system. For example, and in embodiments, the processing system may further comprise a QR code data proxy and one or more servers hosted on the one or more memories, wherein the QR code data proxy is communicatively coupled to the origin of the URL access command and the one or more servers.

For example, and in embodiments, the QR codes may be interpreted by the one or more QR-equipped devices 108 by converting the visual data of the QR code into computer-actionable text that can be used to instruct downstream devices. In embodiments, a program running in the QR-equipped device(s) 108 may be used to pre-process the QR code before reaching the QR data proxy 105. Alternatively, the QR code data may be passed to the QR data proxy 105 via the QR-equipped device and then to the one or more servers for pre-processing. In embodiments, the software in the QR-equipped device(s) 108 for interpreting the QR codes, converting, transmitting, subsequently receiving a return command, and subsequently displaying is not particularly limited and may function similar to any QR-equipped device known in the art, and may be limited only for example by the feedback instructions transmitted from the processing system.

Likewise, the application server 110 may be connected to the QR database 115. The application server 110 may also be connected to a data transfer proxy 135. The data transfer proxy 135 may also be connected to the one or more QR-equipped devices for transferring the feedback instructions, comprising one or more display commands, to the QR-equipped devices, such as via the network 124.

Accordingly, now referring back to FIG. 2, step 228 may additionally comprise the sub-steps 229 and 230, wherein in step 229 the URL access command may be redirected via the QR code proxy to the one or more servers communicatively coupled to the QR code proxy. In step 230, the UID may be filtered from the URL access command via a web application service of the one or more servers hosted on the one or more memories 120 of the processing system 101.

In step 232, the UID of the URL access command may be matched with a corresponding UID of one of the plurality of unique QR codes in the QR database. For example, the UID of the URL access command may be associated with the corresponding UID of the one of the plurality of unique QR codes in the QR database.

In step 236, the one or more feedback instructions associated with the one of the plurality of unique QR codes in the QR database may be transmitted to an origin of the URL access command. In at least these embodiments, the processing system may further comprise a data transfer proxy hosted on the one or more servers of the one or more memories 120, wherein the data transfer proxy is communicatively coupled to the one or more servers and the origin of the URL access command. Accordingly, step 236 may additionally comprise the sub-steps of 237, wherein in step 237, the feedback instructions are redirected to the data transfer proxy, such as via the web application service. Accordingly, the feedback instructions may then be transmitted to the origin of the URL access command via the data transfer proxy.

Now referring back to FIGS. 1-2, and as previously stated, the system may be configured to modify the behavior (the feedback instructions) of the plurality of unique QR codes after printing, such as after receiving one or more of the URL access commands at the QR database and transmitting the corresponding feedback instructions. Accordingly, step 240 may comprise altering the feedback instructions to one or more of the ticket control numbers in the QR database. For example, it may be desired to periodically update the feedback instructions to correspond to current advertisements or promotions by one or more distributors.

Further, as previously stated, the system may be configured, as in step 244, to periodically alter the feedback instructions of one or more of the ticket control numbers as a function of pre-defined periods of the day, wherein feedback instructions comprises an advertising display command, a coupon display command, a discount display command, or combinations thereof. In so being configured, relevant advertisements, coupons, and discounts may be displayed to a user throughout the course of the day.

Further yet, the system may also associate additional information provided with the QR code at the time of redemption to further alter or control the feedback instructions. For example, in step 248, ticket information may be associated with each of the plurality of unique QR codes in the QR database, the ticket information stored in the QR database. The ticket information may comprise the print information for the ticket corresponding to the unique QR code of the plurality of unique QR codes in the QR database; a distribution location for the ticket corresponding to the unique QR code of the plurality of unique QR codes in the QR database; a current status of the ticket corresponding to the unique QR code of the plurality of unique QR codes in the QR database, the current status comprising a default active status and an inactive redeemed status; or combinations thereof.

Further yet, in at least these embodiments, associating the UID of the URL access command with the corresponding UID of the one of the plurality of unique QR codes in the QR database may alter the current status of the ticket from the active status to the redeemed status.

As previously stated, this additional ticket information may in turn be utilized with an IP address and a URL access command origin time to generate analytics for the tickets of the deck. For example, the URL access command may further comprise an IP address and/or a URL access command origin time, the web application service of the one or more servers, further configured to filter the IP address and/or the URL access command origin time from the URL access command as well as to determine a source location for the URL access command based on the IP address, an origin time for the URL access command, or both.

Figure 4A:
FIG. 4A illustrates an exemplary display of ticket analytics according to one or more embodiments herein, particularly illustrating a bar graph illustrating ticket sales performance based on a filtering parameter, such as location of distribution, individual deck, by print information, etc.
Figure 4B:
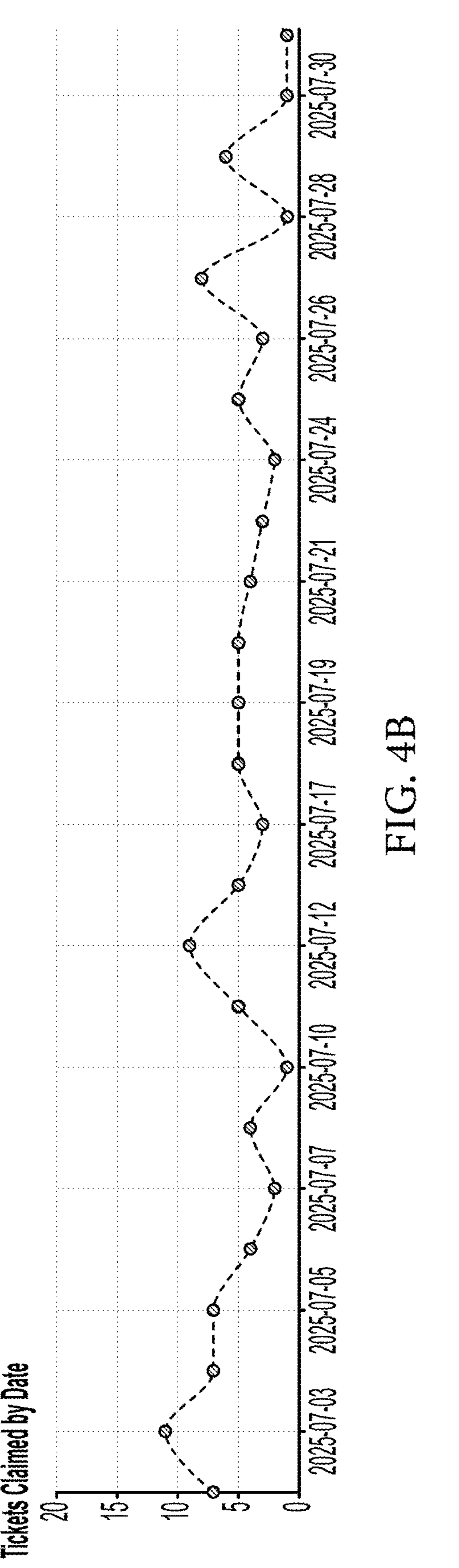
FIG. 4B illustrates another exemplary display of ticket analytics according to one or more embodiments herein, particularly illustrating a line graph showing ticket redemptions as a function of time based on a filtering parameter, such as location of distribution, individual deck, by print information, etc.
Figure 4C:
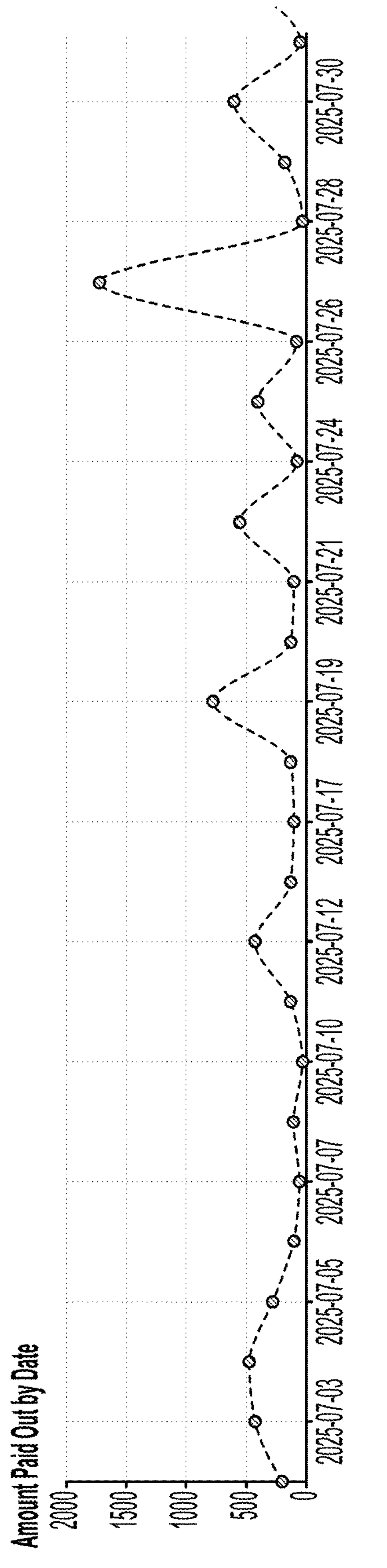
FIG. 4C illustrates another exemplary display of ticket analytics according to one or more embodiments herein, particularly illustrating a line graph showing ticket winning payouts as a function of time based on a filtering parameter, such as location of distribution, individual deck, by print information, etc.

Further, in step 248, associating the UID of the URL access command with the corresponding UID of the one of the plurality of unique QR codes in the QR database may also generate one or more ticket analytics (step 252) for the plurality of tickets based on the print information, the distribution locations, the current statuses, the source locations, the origin times, or combinations thereof such as the ticket analytics shown for example in FIGS. 4A-4C. For example, and in embodiments, after taking in the print information, the distribution locations, the current statuses, the source locations, and the origin times, the ticket analytics aspect of the processing system may comprise a plurality of displays that may be filtered by the print information, the distribution location(s), the current statuses, the source location(s), or a timeframe, thereby allowing the isolation of variables that may enable the interpretation of a wealth of data related to the tickets in a plurality of graphs. Without being limited by theory, this may be of considerable advantage over other methods by enabling the tracking of individual parameters of the print information (such as the ornamental art) for performance as well as isolation of particular locations and timeframes of ticket redemption, allowing tracking outlier instances of winning tickets coming from a single location, and thereby indicating a possibility of fraud or improper sorting/shuffling.

Figure 5:
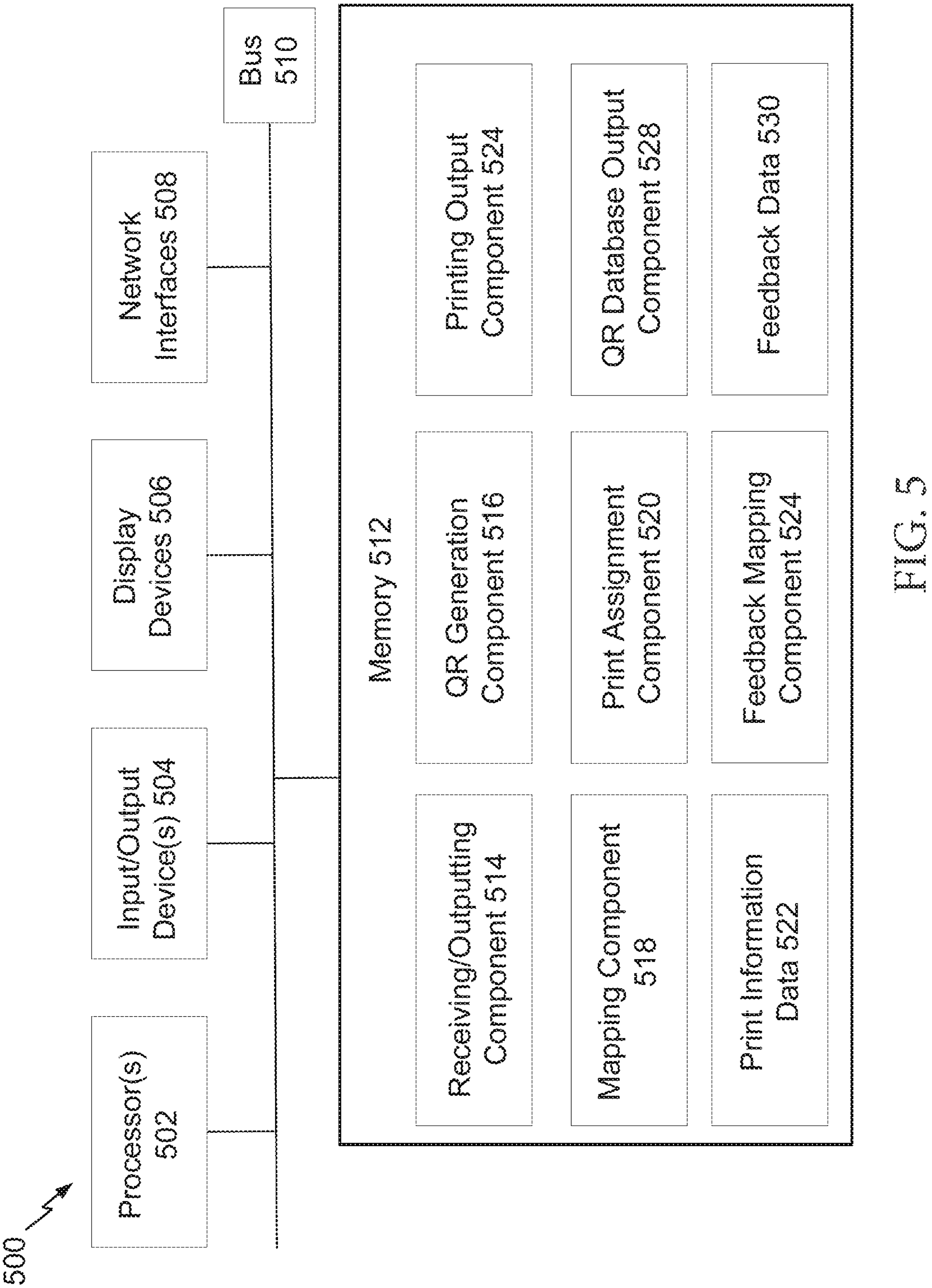
FIG. 5 illustrates an example computing device, according to embodiments herein.

As previously stated, and now referring to FIG. 5, the system 100, and particularly the processing system, may be the computing device 500, which may be configured to perform various aspects described herein, including, for example, the workflow 200 previously described.

The computing device 500 is generally be an example of an electronic device configured to execute computer-executable instructions, such as those derived from compiled computer code, including without limitation personal computers, tablet computers, servers, smart phones, smart devices, wearable devices, augmented and/or virtual reality devices, and others.

In the depicted example, computing device 500 includes one or more processors 502, one or more input/output devices 504, one or more display devices 506, one or more network interfaces 508 through which computing device is connected to one or more networks (e.g., a local network, an intranet, the Internet, or any other group of processing systems communicatively connected to each other), and memory 512. In the depicted example, the aforementioned components are coupled by a bus 510, which may generally be configured for data exchange amongst the components. Bus 510 may be representative of multiple buses, while only one is depicted for simplicity.

Computing device 500 may perform these processes based on one or more processors 502 executing software instructions, stored by a computer-readable medium, such as the one or more memories 512. In certain embodiments, one or more processors may be programmed/designed/configured to perform these processes. A computer-readable medium (e.g., a non-transitory computer-readable medium) is defined herein as a non-transitory memory device. A memory device includes memory space located inside of a single physical storage device or memory space spread across multiple physical storage devices. Software instructions may be read into one or more memories from another computer-readable medium or from another device via network interface 508. When executed, software instructions stored in one or more memories 512 may cause one or more processors 502 to perform one or more processes described herein.

A memory 506 may include data storage or one or more data structures (e.g., a database, etc.). Computing device 500 may be capable of receiving information from, storing information in, communicating information to, or searching information stored in the data storage or one or more data structures in one or more memories 506.

A memory 506 may include random access memory (RAM), read only memory (ROM), and/or other types of dynamic or static storage devices (e.g., flash memory, magnetic memory, optical memory, etc.), that stores information and/or instructions for use by one or more processors 504. For example, a memory 506 may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks.

One or more processors 502 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.), that may be programmed to perform a function, such as described herein.

Input/output device(s) 504 may include any device, mechanism, system, interactive display, and/or various other hardware and software components for communicating information between computing device 500 and one or more computing devices and/or a user of the computing device(s). For example, input/output device(s) 504 may include input hardware, such as a keyboard, touch screen, button, microphone, speaker, and/or other device for receiving inputs from the user and sending outputs to the user.

Display device(s) 506 may generally include any sort of device configured to display data, information, graphics, user interface elements, and the like to a user. For example, display device(s) 506 may include internal and external displays such as an internal display of a tablet computer or an external display for a server computer or a projector. Display device(s) 506 may further include displays for devices, such as augmented, virtual, and/or extended reality devices. In various embodiments, display device(s) 506 may be configured to display a graphical user interface.

Network interface(s) 508 provide computing device with access to external networks and thereby to external processing systems. Network interface(s) 508 can generally be any hardware and/or software capable of transmitting and/or receiving data via a wired or wireless network connection. Accordingly, network interface(s) 508 can include a communication transceiver for sending and/or receiving any wired and/or wireless communication.

Memory 512 may be a volatile memory, such as a random access memory (RAM), or a nonvolatile memory, such as nonvolatile random access memory (NVRAM), or the like. In this example, computer-readable medium 512 may include receiving/outputting component 514 (such as for receiving the print information and transmitting output data back to the network interface 508), a QR generation component 516 (such as for step 204), a Mapping Component 518 (such as for steps 208, 212, 220, 221, and 22), a feedback mapping component 524 (such as for steps 217 and 218), a printing output component 526 (such as for step 224, which may be pair with the receiving/outputting component 514), a QR database output component (such as for step 216, which may be pair with the receiving/outputting component 514), and feedback data 530.

Note that FIG. 5 is just an example of a computing device consistent with embodiments described herein, and other computing devices having additional, alternative, or fewer components are possible consistent with this disclosure.

As previously stated, embodiments herein may also be directed to methods of printing or utilizing the lottery tickets. The methods may utilize any of the systems previously described, and, without being limited, the method may include the workflow 200 or any of the steps of the computer executable-instructions or the FIGS. describing the same.

The present disclosure may include one or more aspects. A first aspect may comprise a system for printing uniquely identifiable quick response (QR) code-containing physical mediums and assigning feedback instructions for the same, the system comprising: a printer configured to print tickets on one or more physical mediums; and an apparatus comprising a processing system comprising one or more memories and one or more processors, the processing system configured to cause the apparatus to execute computer-executable instructions stored in the one or more memories, comprising: generating a plurality of unique QR codes, the plurality of unique QR codes each comprising unique information and non-unique information, wherein the unique information comprises unique identification data (UID), and wherein the non-unique information comprises a website uniform resource locator (URL) destination, a win or loss designation, and a win amount designation, assigning each of the plurality of unique QR codes to a respective simulated ticket of a plurality of simulated tickets, assigning print information to each of the plurality of simulated tickets based on the win or loss designation and the win amount designation, generating a simulated ticket layout for the plurality of simulated tickets on the one or more physical mediums, assigning one or more ticket control numbers to each of the plurality of unique QR codes, assigning one or more feedback instructions to each of the ticket control numbers, storing the plurality of unique QR codes in a QR database hosted on the one or more memories, and printing a plurality of tickets on the one or more physical mediums via the printer based on the simulated ticket layout.

A second aspect may include the first aspect, wherein the UID is encoded in the website URL destination.

A third aspect may include the second aspect, wherein the computer-executable instructions further comprise: receiving a URL access command associated with one of the unique QR codes of one of the plurality of tickets, the URL access command comprising the website URL destination and the UID; matching the UID of the URL access command with a corresponding UID of one of the plurality of unique QR codes in the QR database; and transmitting the one or more feedback instructions associated with the one of the plurality of unique QR codes in the QR database to an origin of the URL access command.

A fourth aspect may include the third aspect, wherein the processing system further comprises a QR code data proxy and one or more servers hosted on the one or more memories, wherein the QR code data proxy is communicatively coupled to the origin of the URL access command and the one or more servers, and wherein matching the UID of the URL access command with the corresponding UID comprises: redirecting the URL access command via the QR code proxy to the one or more servers communicatively coupled to the QR code proxy; filtering the UID from the URL access command via a web application service of the one or more servers; and associating the UID of the URL access command with the corresponding UID of the one of the plurality of unique QR codes in the QR database via the web application service.

A fifth aspect may include the fourth aspect, wherein the processing system further comprises a data transfer proxy hosted on the one or more memories, wherein the data transfer proxy is communicatively coupled to the one or more servers and the origin of the URL access command, and wherein transmitting the one or more feedback instructions associated with the one of the plurality of unique QR codes in the QR database to the origin of the URL access command comprises: redirecting the feedback instructions to the data transfer proxy; and transmitting the feedback instructions to the origin of the URL access command via the data transfer proxy.

A sixth aspect may include either the fourth or fifth aspects, wherein the computer-executable instructions further comprise associating ticket information stored in the QR database with each of the plurality of unique QR codes in the QR database, the ticket information comprising: the print information for the ticket corresponding to the unique QR code of the plurality of unique QR codes in the QR database; a distribution location for the ticket corresponding to the unique QR code of the plurality of unique QR codes in the QR database; and a current status of the ticket corresponding to the unique QR code of the plurality of unique QR codes in the QR database, the current status comprising a default active status and an inactive redeemed status, wherein associating the UID of the URL access command with the corresponding UID of the one of the plurality of unique QR codes in the QR database alters the current status of the ticket from the active status to the redeemed status.

A seventh aspect may include the sixth aspect, wherein the URL access command further comprises an IP address, the web application service further configured to filter the ip address from the URL access command as well as to determine a source location for the URL access command based on the IP address; and associating the UID of the URL access command with the corresponding UID of the one of the plurality of unique QR codes in the QR database also generates one or more ticket analytics for the plurality of tickets based on the print information, the distribution locations, the current statuses, and the source locations.

An eighth aspect may include the seventh aspect, wherein the URL access command further comprises a URL access command origin time, the web application service further configured to filter the URL access command origin time from the URL access command as well as to determine an origin time for the URL access command; and associating the UID of the URL access command with the corresponding UID of the one of the plurality of unique QR codes in the QR database also generates one or more ticket analytics for the plurality of tickets based on the print information, the distribution locations, the current statuses, and the origin times.

A ninth aspect may include any of the third through eighth aspects, wherein the computer-executable instructions further comprise: receiving a plurality of the unique URL access commands at the QR database and transmitting the corresponding feedback instructions; and altering the feedback instructions to one or more of the ticket control numbers in the QR database.

A tenth aspect may include any previous aspect, wherein the computer-executable instructions further comprise periodically altering the feedback instructions of one or more of the ticket control numbers as a function of pre-defined time periods of the day, wherein the feedback instructions comprises an advertising display command, a coupon display command, a discount display command, or combinations thereof.

An eleventh aspect may include any previous aspect, wherein: a win ticket control number is assigned to all of the QR codes in the QR database comprising a win designation, wherein the feedback instructions associated with the win ticket control number comprise a winning ticket display command; a win amount ticket control number is assigned to all of the QR codes in the QR database comprising a win amount designation, wherein the feedback instructions associated with the win amount ticket control number comprise a winning amount display command; and a loss ticket control number is assigned to all of the QR codes in the QR database comprising a loss designation, wherein the feedback instructions associated with the loss ticket control number comprise a losing ticket display command.

A twelfth aspect may include the eleventh aspect, wherein the feedback instructions associated with the loss ticket control number, the win ticket control number, or both further comprise a user login page, a sweepstakes URL display command, a sweepstakes URL destination, or combinations thereof.

A thirteenth aspect may include any previous aspect, wherein a global activation ticket control number is assigned to all of the unique QR codes; and the feedback instructions assigned to the global activation ticket control number is a global modification command comprising either a global activation command or a global deactivation command, the global deactivation command co-exclusive with all other feedback instructions.

A fourteenth aspect may include any previous aspect, wherein the UID comprises a multi character code.

A fifteenth aspect may include any previous aspect, wherein the print information further comprises dimensions of each of the plurality of tickets, ornamental art for each of the plurality of tickets, art combinations for winning tickets, art combinations for losing tickets, or combinations thereof.

A sixteenth aspect may include any previous aspect, wherein the one or more tickets are lottery tickets; and the one or more physical mediums comprise an overlying medium configured to obscure the unique QR code and at least a portion of the print information of each of the lottery tickets.

A seventeenth aspect may include the sixteenth aspect, wherein the lottery tickets are scratch-off lottery tickets or pull-tab lottery tickets.

An eighteenth aspect may include the seventeenth aspect, wherein the printer is configured to print on a plurality of physical mediums; and generating a simulated ticket layout for the plurality of simulated tickets on the plurality of physical mediums comprises: designating a maximum of tickets comprising a win designation per physical medium, and assigning each of the simulated tickets to a location on the plurality of physical mediums such that each physical medium of the plurality of physical mediums does not exceed the maximum of ticket comprising the win designation per physical medium.

A nineteenth aspect may include any previous aspect, and may additionally or alternatively include a system for printing uniquely identifiable quick response (QR) code-containing physical mediums and assigning feedback instructions for the same, the system comprising: a printer configured to print lottery tickets on one or more physical mediums; and an apparatus comprising a processing system comprising one or more memories and one or more processors, the processing system configured to cause the apparatus to execute computer-executable instructions stored in the one or more memories, comprising: generating a plurality of unique QR codes, the plurality of unique QR codes each comprising unique information and non-unique information, wherein the unique information comprises unique identification data (UID) comprising a multicharacter code, wherein the non-unique information comprises a website uniform resource locator (URL) destination, a win or loss designation, and a win amount designation, and wherein the UID is encoded in the website URL destination, assigning each of the plurality of unique QR codes to a respective simulated ticket of a plurality of simulated tickets, assigning print information to each of the plurality of simulated tickets based on the win or loss designation and the win amount designation, generating a simulated ticket layout for the plurality of simulated tickets on the one or more physical mediums, assigning one or more ticket control numbers to each of the plurality of unique QR codes, assigning one or more feedback instructions to each of the ticket control numbers, storing the plurality of unique QR codes in a QR database hosted on the one or more memories, the one or more memories also hosting a QR code data proxy and one or more servers, printing a plurality of tickets on the one or more physical mediums via the printer based on the simulated ticket layout, receiving a URL access command associated with one of the unique QR codes of one of the plurality of tickets, the URL access command comprising the website URL destination and the UID, redirecting the URL access command via the QR code proxy to the one or more servers communicatively coupled to the QR code proxy, filtering the UID from the URL access command via a web application service of the one or more servers, associating the UID of the URL access command with the corresponding UID of the one of the plurality of unique QR codes in the QR database via the web application service, and transmitting the one or more feedback instructions associated with the one of the plurality of unique QR codes in the QR database to an origin of the URL access command.

A twentieth aspect may include any previous aspect, and may additionally or alternatively include a method for printing uniquely identifiable quick response (QR) code-containing physical mediums and assigning feedback instructions for the same, the method comprising: generating a plurality of unique QR codes via a processing system comprising one or more processors and one or more memories, the plurality of unique QR codes each comprising unique information and non-unique information, wherein the unique information comprises unique identification data (UID), and wherein the non-unique information comprises a website uniform resource locator (URL) destination, a win or loss designation, and a win amount designation; assigning each of the plurality of unique QR codes to a respective simulated ticket of a plurality of simulated tickets; assigning print information to each of the plurality of simulated tickets based on the win or loss designation and the win amount designation; generating a simulated ticket layout for the plurality of simulated tickets on the one or more physical mediums; assigning one or more ticket control numbers to each of the plurality of unique QR codes; assigning one or more feedback instructions to each of the ticket control numbers; storing the plurality of unique QR codes in a QR database hosted on the one or more memories; and printing a plurality of tickets on one or more physical mediums via a printer communicatively coupled to the processing system based on the simulated ticket layout.

A twenty-first aspect may include any previous aspect, and may additionally or alternatively comprise a method for recognizing and transmitting feedback instructions to a plurality of tickets having unique QR codes, the method comprising: obtaining the plurality of tickets having the unique QR codes, each QR code having unique information and non-unique information, wherein the unique information comprises unique identification data (UID), and wherein the non-unique information comprises a website URL destination, a win or loss designation, and a win amount designation; receiving a URL access command associated with one of the unique QR codes of one of the plurality of tickets, the URL access command comprising the website URL destination and the UID; matching the UID of the URL access command with a corresponding UID of one of the plurality of unique QR codes in a QR database hosted one or more memories of a processing system; and transmitting the one or more feedback instructions associated with the one of the plurality of unique QR codes in the QR database to an origin of the URL access command.

It is noted that recitations in the present disclosure of a component of the present disclosure being "operable" or "sufficient" in a particular way, to embody a particular property, or to function in a particular manner, are structural recitations, as opposed to recitations of intended use. More specifically, the references in the present disclosure to the manner in which a component is "operable" or "sufficient" denotes an existing physical condition of the component and, as such, is to be taken as a definite recitation of the structural characteristics of the component.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising." It is noted that the use of the terms "having" or "including", or grammatical variations thereof, in this disclosure should also be interpreted in like manner as the more commonly used open-ended preamble term "comprising".

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). Reference to an element in the singular is not intended to mean only one unless specifically so stated, but rather "one or more." For example, reference to an element (e.g., "a processor," "a memory," etc.), unless otherwise specifically stated, should be understood to refer to one or more elements (e.g., "one or more processors," "one or more memories," etc.). The terms "set" and "group" are intended to include one or more elements, and may be used interchangeably with "one or more." Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions. Unless specifically stated otherwise, the term "some" refers to one or more.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112 (f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

Having described the subject matter of the present embodiments herein in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present embodiments including, but not limited to, embodiments defined in the appended claims. More specifically, although some aspects of the present embodiments are identified herein as preferred or particularly advantageous, it is contemplated that the present embodiments is not necessarily limited to these aspects.

What is claimed is:

1. A system for printing uniquely identifiable quick response (QR) code-containing physical mediums and assigning feedback instructions for the same, the system comprising:

a printer configured to print on one or more physical mediums; and an apparatus comprising a processing system comprising one or more memories and one or more processors, the processing system configured to cause the apparatus to execute computer-executable instructions stored in the one or more memories, comprising:

generating a plurality of unique QR codes, the plurality of unique QR codes each comprising unique information and non-unique information, wherein the non-unique information comprises a website uniform resource locator (URL) destination, a win or loss designation, and a win amount designation, and wherein the unique information comprises unique identification data (UID) comprising a multicharacter code encoded in the website URL destination, assigning each of the plurality of unique QR codes to a respective simulated ticket of a plurality of simulated tickets, assigning print information to each of the plurality of simulated tickets based on the win or loss designation and the win amount designation, generating a simulated ticket layout for the plurality of simulated tickets on the one or more physical mediums, assigning one or more ticket control numbers to each of the plurality of unique QR codes, assigning one or more feedback instructions to each of the ticket control numbers, storing the plurality of unique QR codes in a QR database hosted on the one or more memories, the one or more memories also hosting a QR code data proxy and one or more servers, printing a plurality of tickets on the one or more physical mediums via the printer based on the simulated ticket layout, in response to receiving a URL access command associated with one of the unique QR codes of one of the plurality of tickets, redirecting the URL access command via the QR code proxy to the one or more servers communicatively coupled to the QR code proxy, wherein the URL access command comprises the website URL destination and the UID, filtering the UID from the URL access command via a web application service of the one or more servers, associating the UID of the URL access command with the corresponding UID of the one of the plurality of unique QR codes in the QR database via the web application service, and transmitting the one or more feedback instructions associated with the one of the plurality of unique QR codes in the QR database to an origin of the URL access command.

2. The system of claim 1, wherein the processing system further comprises a data transfer proxy hosted on the one or more memories, wherein the data transfer proxy is communicatively coupled to the one or more servers and the origin of the URL access command, and wherein transmitting the one or more feedback instructions associated with the one of the plurality of unique QR codes in the QR database to the origin of the URL access command comprises:

redirecting the feedback instructions to the data transfer proxy; and transmitting the feedback instructions to the origin of the URL access command via the data transfer proxy.

3. The system of claim 1, wherein the computer-executable instructions further comprise associating ticket information stored in the QR database with each of the plurality of unique QR codes in the QR database, the ticket information comprising:

the print information for the ticket corresponding to the unique QR code of the plurality of unique QR codes in the QR database;

a distribution location for the ticket corresponding to the unique QR code of the plurality of unique QR codes in the QR database; and a current status of the ticket corresponding to the unique QR code of the plurality of unique QR codes in the QR database, the current status comprising a default active status and an inactive redeemed status, wherein associating the UID of the URL access command with the corresponding UID of the one of the plurality of unique QR codes in the QR database alters the current status of the ticket from the active status to the redeemed status.

4. The system of claim 3, wherein:

the URL access command further comprises an internet protocol (IP) address, the web application service further configured to filter the IP address from the URL access command as well as to determine a source location for the URL access command based on the IP address; and associating the UID of the URL access command with the corresponding UID of the one of the plurality of unique QR codes in the QR database also generates one or more ticket analytics for the plurality of tickets based on the print information, the distribution locations, the current statuses, and the source locations.

5. The system of claim 4, wherein:

the URL access command further comprises a URL access command origin time, the web application service further configured to filter the URL access command origin time from the URL access command as well as to determine an origin time for the URL access command; and associating the UID of the URL access command with the corresponding UID of the one of the plurality of unique QR codes in the QR database also generates one or more ticket analytics for the plurality of tickets based on the print information, the distribution locations, the current statuses, and the origin times.

6. The system of claim 1, wherein the computer-executable instructions further comprise:

receiving a plurality of the unique URL access commands at the QR database and transmitting the corresponding feedback instructions; and altering the feedback instructions to one or more of the ticket control numbers in the QR database.

7. The system of claim 1, wherein the computer-executable instructions further comprise periodically altering the feedback instructions of one or more of the ticket control numbers as a function of pre-defined time periods of the day, wherein the feedback instructions comprises an advertising display command, a coupon display command, a discount display command, or combinations thereof.

8. The system of claim 1, wherein:

a win ticket control number is assigned to all of the QR codes in the QR database comprising a win designation, wherein the feedback instructions associated with the win ticket control number comprise a winning ticket display command;

a win amount ticket control number is assigned to all of the QR codes in the QR database comprising a win amount designation, wherein the feedback instructions associated with the win amount ticket control number comprise a winning amount display command; and a loss ticket control number is assigned to all of the QR codes in the QR database comprising a loss designation, wherein the feedback instructions associated with the loss ticket control number comprise a losing ticket display command.

9. The system of claim 8, wherein the feedback instructions associated with the loss ticket control number, the win ticket control number, or both further comprise a user login page, a sweepstakes URL display command, a sweepstakes URL destination, or combinations thereof.

10. The system of claim 1, wherein:

a global activation ticket control number is assigned to all of the unique QR codes; and the feedback instructions assigned to the global activation ticket control number is a global modification command comprising either a global activation command or a global deactivation command, the global deactivation command co-exclusive with all other feedback instructions.

11. The system of claim 1, wherein the print information further comprises dimensions of each of the plurality of tickets, ornamental art for each of the plurality of tickets, art combinations for winning tickets, art combinations for losing tickets, or combinations thereof.

12. The system of claim 11, wherein:

the one or more tickets are lottery tickets; and the one or more physical mediums comprise an overlying medium configured to obscure the unique QR code and at least a portion of the print information of each of the lottery tickets.

13. The system of claim 12, wherein the lottery tickets are scratch-off lottery tickets or pull-tab lottery tickets.

14. The system of claim 1, wherein:

the printer is configured to print on a plurality of physical mediums; and generating a simulated ticket layout for the plurality of simulated tickets on the plurality of physical mediums comprises:

designating a maximum of tickets comprising a win designation per physical medium, and assigning each of the simulated tickets to a location on the plurality of physical mediums such that each physical medium of the plurality of physical mediums does not exceed the maximum of ticket comprising the win designation per physical medium.

15. A method for printing uniquely identifiable quick response (QR) code-containing physical mediums and assigning feedback instructions for the same, the method comprising:

generating a plurality of unique QR codes, the plurality of unique QR codes each comprising unique information and non-unique information, wherein the non-unique information comprises a website uniform resource locator (URL) destination, a win or loss designation, and a win amount designation, and wherein the unique information comprises unique identification data (UID) comprising a multicharacter code encoded in the website URL destination;

assigning each of the plurality of unique QR codes to a respective simulated ticket of a plurality of simulated tickets;

assigning print information to each of the plurality of simulated tickets based on the win or loss designation and the win amount designation;

generating a simulated ticket layout for the plurality of simulated tickets on the one or more physical mediums;

assigning one or more ticket control numbers to each of the plurality of unique QR codes;

assigning one or more feedback instructions to each of the ticket control numbers;

storing the plurality of unique QR codes in a QR database hosted on the one or more memories, the one or more memories also hosting a QR code data proxy and one or more servers;

printing a plurality of tickets on one or more physical mediums via a printer communicatively coupled to the processing system based on the simulated ticket layout;

receiving a URL access command associated with one of the unique QR codes of one of the plurality of tickets;

redirecting the URL access command via the QR code proxy to the one or more servers communicatively coupled to the QR code proxy, wherein the URL access command comprises the website URL destination and the UID;

filtering the UID from the URL access command via a web application service of the one or more servers;

associating the UID of the URL access command with the corresponding UID of the one of the plurality of unique QR codes in the QR database via the web application service; and transmitting the one or more feedback instructions associated with the one of the plurality of unique QR codes in the QR database to an origin of the URL access command.

16. A system for utilizing uniquely identifiable quick response (QR) codes and assigning feedback instructions for the same comprising an apparatus comprising a processing system comprising one or more memories and one or more processors, the processing system configured to cause the apparatus to execute computer-executable instructions stored in the one or more memories, comprising:

storing unique QR codes of a plurality of physical mediums in a QR database hosted on the one or more memories, wherein:

each physical medium has print information and one of the plurality of unique QR codes, the one or more memories also host a QR code data proxy and one or more servers, each of the unique QR codes comprise unique information and non-unique information, the unique information comprises unique identification data (UID) comprising a multicharacter code, the non-unique information comprises a website uniform resource locator (URL) destination, a win or loss designation, and a win amount designation, and the print information is based on the win or loss designation and the win amount designation;

assigning one or more ticket control numbers to each of the plurality of unique QR codes;

assigning one or more feedback instructions to each of the ticket control numbers;

in response to receiving a URL access command associated with one of the unique QR codes of one of the plurality of tickets, redirecting the URL access command via the QR code proxy to the one or more servers communicatively coupled to the QR code proxy, wherein the URL access command comprises the website URL destination and the UID;

filtering the UID from the URL access command via a web application service of the one or more servers;

associating the UID of the URL access command with the corresponding UID of the one of the plurality of unique QR codes in the QR database via the web application service; and transmitting the one or more feedback instructions associated with the one of the plurality of unique QR codes in the QR database to an origin of the URL access command.

17. The system of claim 16, wherein the processing system further comprises a data transfer proxy hosted on the one or more memories, wherein the data transfer proxy is communicatively coupled to the one or more servers and the origin of the URL access command, and wherein transmitting the one or more feedback instructions associated with the one of the plurality of unique QR codes in the QR database to the origin of the URL access command comprises:

redirecting the feedback instructions to the data transfer proxy; and transmitting the feedback instructions to the origin of the URL access command via the data transfer proxy.

18. The system of claim 16, wherein the computer-executable instructions further comprise associating ticket information stored in the QR database with each of the plurality of unique QR codes in the QR database, the ticket information comprising:

the print information for the ticket corresponding to the unique QR code of the plurality of unique QR codes in the QR database;

a distribution location for the ticket corresponding to the unique QR code of the plurality of unique QR codes in the QR database; and a current status of the ticket corresponding to the unique QR code of the plurality of unique QR codes in the QR database, the current status comprising a default active status and an inactive redeemed status, wherein associating the UID of the URL access command with the corresponding UID of the one of the plurality of unique QR codes in the QR database alters the current status of the ticket from the active status to the redeemed status.

19. The system of claim 18, wherein:

the URL access command further comprises an internet protocol (IP) address, the web application service further configured to filter the IP address from the URL access command as well as to determine a source location for the URL access command based on the IP address;

associating the UID of the URL access command with the corresponding UID of the one of the plurality of unique QR codes in the QR database also generates one or more ticket analytics for the plurality of tickets based on the print information, the distribution locations, the current statuses, and the source locations;

the URL access command further comprises a URL access command origin time, the web application service further configured to filter the URL access command origin time from the URL access command as well as to determine an origin time for the URL access command; and associating the UID of the URL access command with the corresponding UID of the one of the plurality of unique QR codes in the QR database also generates one or more ticket analytics for the plurality of tickets based on the print information, the distribution locations, the current statuses, and the origin times.

20. The system of claim 16, wherein the computer-executable instructions further comprise periodically altering the feedback instructions of one or more of the ticket control numbers as a function of pre-defined time periods of the day, wherein the feedback instructions comprises an advertising display command, a coupon display command, a discount display command, or combinations thereof.

* * * * *